United States Patent
Su et al.

(10) Patent No.: US 9,484,967 B1
(45) Date of Patent: Nov. 1, 2016

(54) METHOD FOR DUTY CYCLE DISTORTION DETECTION THROUGH DECISION FEEDBACK EQUALIZER TAPS

(71) Applicant: Oracle International Corporation, Redwood City, CA (US)

(72) Inventors: Jianghui Su, San Jose, CA (US); Yan Yan, San Jose, CA (US); Jieda Li, Evanston, IL (US)

(73) Assignee: Oracle International Corporation, Redwood Shores, CA (US)

( * ) Notice: Subject to any disclaimer, the term of this patent is extended or adjusted under 35 U.S.C. 154(b) by 33 days.

(21) Appl. No.: 14/681,796

(22) Filed: Apr. 8, 2015

(51) Int. Cl.
*H04L 25/08* (2006.01)
*H04B 1/10* (2006.01)
*H04B 17/24* (2015.01)
*H04B 17/21* (2015.01)

(52) U.S. Cl.
CPC ............ *H04B 1/1027* (2013.01); *H04B 17/21* (2015.01); *H04B 17/24* (2015.01)

(58) Field of Classification Search
CPC ............... H04L 25/03038; H04L 2025/0349; H04L 25/03019; H04B 1/00; H04B 3/32
USPC .................................................. 375/316, 348
See application file for complete search history.

(56) References Cited

U.S. PATENT DOCUMENTS

| | | | |
|---|---|---|---|
| 6,904,110 B2 | 6/2005 | Trans | |
| 7,848,470 B2 | 12/2010 | Hidaka | |
| 9,148,315 B1 | 9/2015 | Qian | |
| 2008/0187037 A1* | 8/2008 | Bulzacchelli | H03K 5/02 375/233 |
| 2009/0097541 A1* | 4/2009 | Aziz | H04L 1/205 375/233 |

* cited by examiner

*Primary Examiner* — David S Huang
(74) *Attorney, Agent, or Firm* — Meyertons, Hood, Kivlin, Kowert & Goetzel, P.C.; Erik A. Heter

(57) ABSTRACT

An embodiment includes a receiver circuit, a feedback circuit and a control circuit. The receiver circuit is configured to receive each data bit of a plurality of data bits. The feedback circuit is configured to measure a first interference level generated by a first data bit of a first subset of the plurality of data bits on a second data bit of the plurality of data bits to generate one of a first plurality of feedback values. The feedback circuit is also configured to measure a second interference level generated by a third data bit of a second subset of the plurality of data bits on a fourth data bit of the plurality of data bits to generate one of a second plurality of feedback values. The control circuit is configured to determine a duty cycle dependent upon a comparison of the first plurality to the second plurality.

20 Claims, 8 Drawing Sheets

METHOD FOR DUTY CYCLE DISTORTION DETECTION THROUGH DECISION FEEDBACK EQUALIZER TAPS

BACKGROUND OF THE INVENTION

1. Field of the Invention

This invention relates to high performance computing network systems, and more particularly, to clock and data recovery methods for systems using serialized data transmission.

2. Description of the Relevant Art

The performance of computing systems is dependent on both hardware and software. In order to increase the throughput of computing systems, the parallelization of tasks is utilized as much as possible. To this end, compilers may extract parallelized tasks from program code and hardware may include multiple copies of structures to execute the parallelized tasks. The structures may include functional units, processor cores, and nodes.

Communication between the multiple structures may utilize wide communication buses, i.e., buses that transport data words of 16-bits, 32-bits, 64-bits, or more in parallel. The physical implementation of such communication buses may consume significant area/cost on an integrated circuit (IC), a circuit board or in cables between circuit boards. Additionally, cross-capacitance, electromagnetic interference (EMI), and parasitic inductance on wide buses increase the power consumption and noise effects of the computing system. Such parasitic effects may become more pronounced with increased operational frequencies and reduced geometric dimensions of the wide buses themselves, bond wires, integrated circuit (IC) package leads, and external supply lines. Mismatch of impedance values at the end of transmission lines may result in reflection or ringing, increased propagation delays, and voltage droop of the signals being transmitted.

Reducing the problems with high-speed parallel data transmission may include use of high-speed serial communication. Several examples of high-speed serial communications standards include wired standards, such as, Ethernet, Universal Serial Bus (USB, and USB 3.0 in particular), and Serial AT Attachment (SATA). While these examples typically involve communication over a length of cable between two circuit boards, high-speed serial communications may be used between devices on a common circuit board or between functional blocks within a single IC. Serial communication is also used in wireless standards, such as Wi-Fi™ and Bluetooth™. One way of further reducing communication lines and the associated issues is by eliminating a dedicated clock signal in the communication path. In some embodiments, a receiver may share a clock source with a transmitter and therefore may not require a separate clock signal. However, if a clock signal is not shared between a transmitter and a receiver, then a method for transmitting a clock signal from the transmitting circuit to the receiving circuit is required. One method for transmitting a clock signal is to embed the clock signal within the data stream.

A challenge may arise from variations of the duty cycle of a received stream of data bits from a transmitter. Generally speaking, a 50% duty cycle is desired such that the length of time each bit of data is valid is the same for each data bit. If the duty cycle deviates from 50% then the data bit valid times will alternate between being long and short. For example, in a 1 Gigabit per second (Gbps) communication link, a 50% duty cycle results in each data bit being valid for 1 nanosecond. If the duty cycle deviates to 60%, then the data bits will alternate between being valid for 1.2 nanoseconds and 0.8 nanoseconds. The shorter bit times may result in errors by the receiver reading the data.

SUMMARY OF THE EMBODIMENTS

Systems and methods for improving the reliability and accuracy of clock and data recovery within systems using serialized data transmission are contemplated. In one embodiment, an apparatus may include a receiver circuit, a feedback circuit, and a control circuit. The receiver circuit may be configured to serially receive each data bit of a plurality of data bits. The feedback circuit may be configured to measure a first level of interference generated by a first data bit of a first subset of the plurality of data bits on a second data bit of the plurality of data bits to generate a respective one of a first plurality of feedback values. The second data bit may be received subsequent to the first data bit. The feedback circuit may also be configured to measure a second level of interference generated by a third data bit of a second subset of the plurality of data bits on a fourth data bit of the plurality of data bits to generate a respective one of a second plurality of feedback values. The fourth data bit may be received subsequent to the third data bit. The control circuit may be configured to determine a value of a duty cycle dependent upon a comparison of the first plurality of feedback values to the second plurality of feedback values.

In another embodiment, the control circuit may be further configured to determine an amount of variance of the value of the duty cycle from a target duty cycle value. In a further embodiment, the control circuit may be further configured to send a value corresponding to the amount of variance to a transmitter circuit responsible for sending the plurality of data bits to the receiver circuit.

In one embodiment, the first data bit of the first subset of the plurality of data bits may occupy an odd numbered sequence position. In a further embodiment, the third data bit of the second subset of the plurality of data bits may occupy an even numbered sequence.

In another embodiment, the plurality of data bits may include a pseudo random binary sequence (PRBS). In a further embodiment, the receiver circuit may be further configured to receive the PRBS during a calibration operation.

These and other embodiments will become apparent upon reference to the following description and accompanying drawings.

BRIEF DESCRIPTION OF THE DRAWINGS

FIG. 6 includes two figures.

Figure 1:
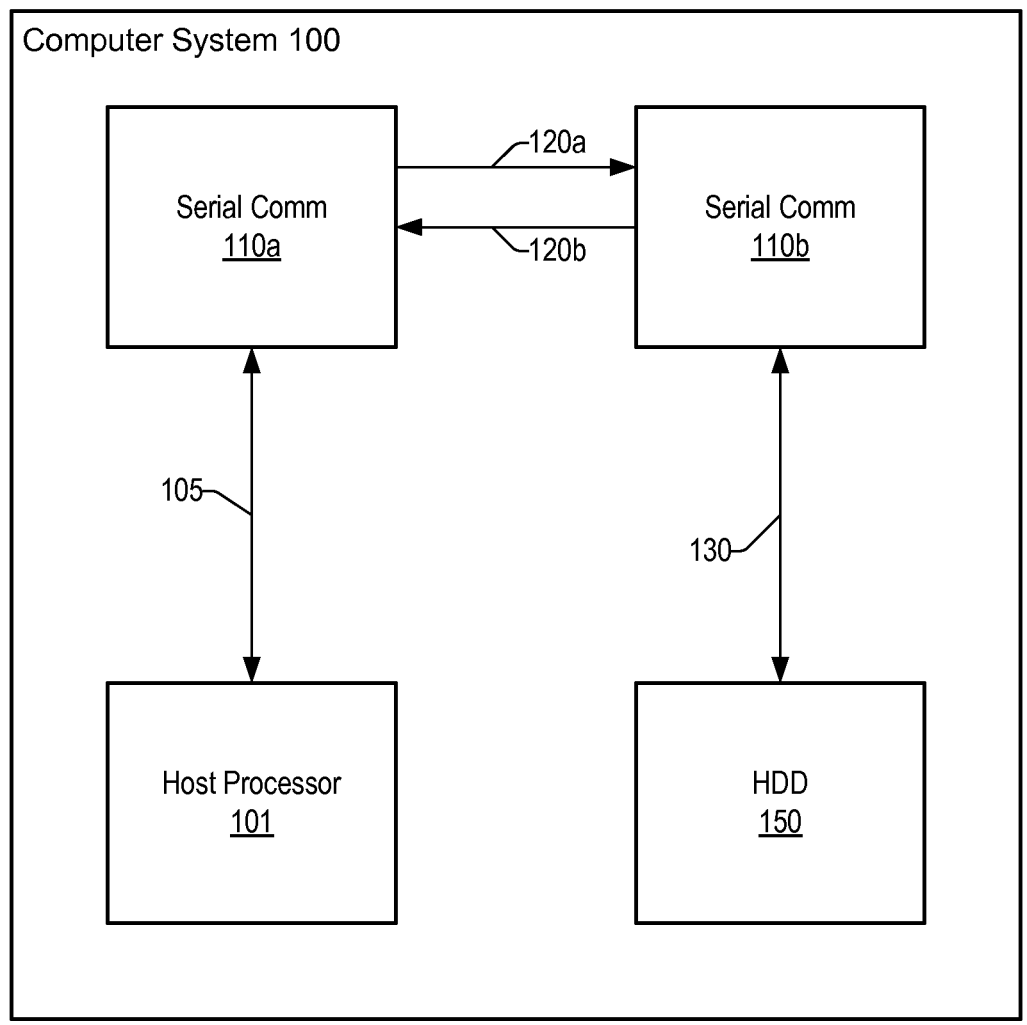
FIG. 1 is a generalized block diagram illustrating an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f), interpretation for that unit/circuit/component. More generally, the recitation of any element is expressly intended not to invoke 35 U.S.C. §112, paragraph (f), interpretation for that element unless the language "means for" or "step for" is specifically recited.

DETAILED DESCRIPTION OF EMBODIMENTS

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Some examples of applications utilizing serial communication links include network routers (wired and wireless), fiber optic communication systems, gigabit Ethernet systems, flat panel displays, Bluetooth links between portable devices and components, and cache coherence links in chip multi-threading (CMT) systems with multiple nodes. An example of a hard disk drive (HDD) connected to a processor mother board through a high speed serial interface, utilizing serial communication links is provided as an illustration of duty cycle distortion (DCD) detection and correction methods. The high speed serial interface may be any suitable standard such as, e.g., Serial Advance Technology Attachment (SATA) or Universal Serial Bus 3.0 (USB 3.0), or may be a proprietary high speed interface. Although a HDD connection through a high speed serial interface is used as an example, the steps and techniques described may be applied to other systems such as gigabit Ethernet or Fibre Channel networks.

In view of the above, methods and mechanisms for detecting and correcting duty cycle distortion within systems using serial data transmission are desired. Various embodiments of a serial communication link are described in this disclosure. The embodiments illustrated in the drawings and described below may provide techniques for detecting and correcting duty cycle distortion within a serial communication link.

Serial Communication Link Overview

Referring to FIG. 1, a generalized block diagram illustrating one embodiment of a computing system 100 is shown. Computing system 100 may include host processor 101, coupled to communication unit 110a through interface 105. Communication unit 110a may be coupled to communication unit 110b through communication channels 120a and 120b. Communication unit 110b may be coupled to hard disk drive (HDD) 150 through interface 130.

Host processor 101 may request a file from HDD 150. In some embodiments, host processor 150 may be a motherboard including one or more processor cores. In some embodiments, the processor cores may implement any suitable instruction set architecture (ISA), such as, e.g., SPARC, PowerPC™, or x86 ISAs, or a combination thereof. Host processor 101 may include one or more bus interfaces, such as, e.g., interface 105, which may allow host processor 101 to communication to other functional blocks within SoC 100 such as, communication unit 110a for example. Interface 105 may be a parallel bus interface of any suitable width, such as, for example 16, 32, or 64 bits wide.

Host processor 101 may issue a command to communication unit 110a through interface 105 to initiate a connection to HDD 150 through communication unit 110b. Communication unit 110a and communication unit 110b may include circuits configured to transmit and receive data from parallel interfaces such as interfaces 105 and 130 using serial channels 120a and 120b. Communication units 110 may be configured to transport data at rates of 3 Gbit/s or higher. In addition, communication units 110 may include only differential data pairs with no dedicated clock signal between communication unit 110a and communication unit 110b. Since communication units 110 may not be physically located on the same circuit board, they may not share a single clock source. Therefore, communication units 110 may require the transmitting block to encode a clock signal within the data stream utilizing a suitable duty cycle.

Serial channels 120a-b may conform to one or more high speed serial standards and include a copper wire cable with multiple conductive paths coupled between communication units 110a and 110b. Serial channel 120a may be a unidirectional path from communication unit 110a to communication unit 110b and conversely serial channel 120b may be a unidirectional path from communication unit 110b to communication unit 110a. In other embodiments, other standards may be employed, and serial channels 120 may be bidirectional. A channel may also be referred to as a lane. Parallel data is serialized prior to transmission across a respective channel/lane.

Communication unit 110a may receive the command from host processor 101 to initiate a connection to communication unit 110b. To initiate a connection, a process referred to as channel training, or link training, may be utilized to configure serial channel 120a. Communication unit 110a may send a stream of bits to communication unit 110b. Communication unit 110b may sample the stream of bits until data timing requirements can be derived. Once timing requirements are derived, communication unit 110b may calculate one or more characteristics, including duty cycle distortion, which will be sent to communication unit 110a to be used to adjust how communication unit 110a transmits data to communication unit 110b. This process is referred to herein as precursor adaptation, and is used to overcome various factors that negatively impact the clarity of data transmitted from communication unit 110a to communication unit 110b, such as, for example, EMI generated from the system or occurring within the environment, as well as effects that may be created when a high speed signal travels along a copper wire, such as signal reflection. More details regarding signal quality will be discussed later.

Once serial channel 120a has been initiated and configured, the process may repeat to initiate and configure serial channel 120b, with communication unit 110b sending the stream of data bits and communication unit 110a receiving the data, deriving data timing requirements and calculating a precursor. Once both serial channels 120 are configured, host processor 101 may send a command through communication units 110 to HDD 150, for example, to read a file stored on HDD 150. Communication unit 110b may receive the command from host processor 101 via communication unit 110a and transport the command to HDD 150 through interface 130.

Interface 130 may be a parallel interface of any suitable width necessary to read data from HDD at a high enough rate to sustain the effective data rate of the serial communication link. Interface 130 may be 32, 64, 128, or more bits wide to read HDD 150 at an adequate data rate.

HDD 150 may receive the command from communication unit 110b and respond with the data from the requested file. In some embodiments, status data or handshaking protocols may be sent before the requested data. HDD 150 may be any suitable hard disk drive from any manufacturer, such as, for example, Seagate or Western Digital. Although a hard disk drives is used as an example, any storage medium may be contemplated, such as, e.g., solid-state drives or optical drives.

It is noted the embodiment of FIG. 1 is merely an example for the purpose of demonstrating a serial communication link. Other forms of serial communication links are possible and contemplated, such as, for example, a gigabit Ethernet network or a USB 3.0 connection between a computer and a digital camera. In other embodiments, wireless communication links may also be utilized.

Figure 2:
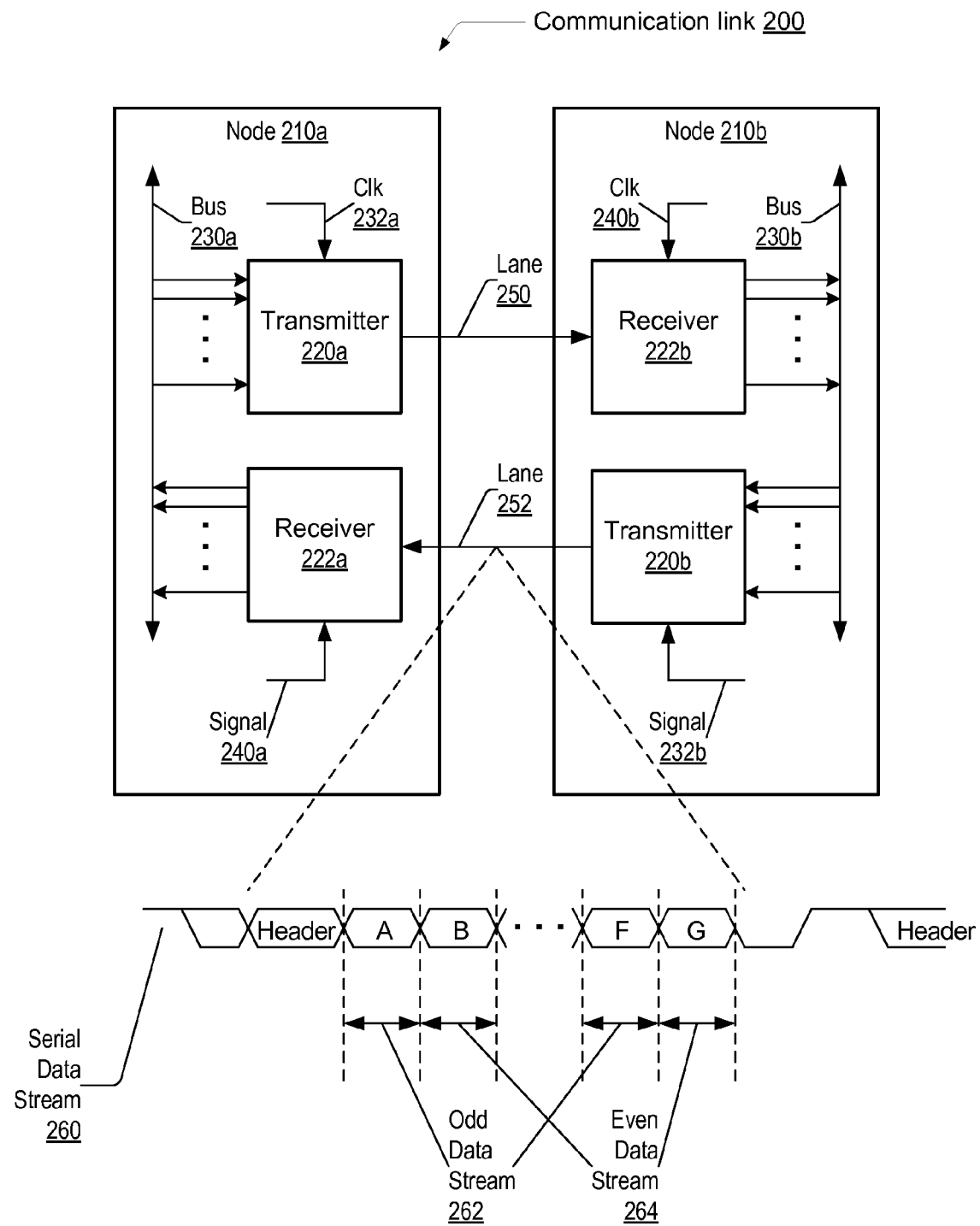
FIG. 2 is a generalized block diagram illustrating an embodiment of a serial communication link.

Referring to FIG. 2, a generalized block diagram illustrating one embodiment of a communication link 200 is shown. The system includes nodes 210a-210b. Although two nodes are shown in FIG. 2, other embodiments may include a different number of nodes. Nodes as described and used herein, may include functional blocks, functional units, routers, chips or chipsets, data transmission buffers such as a transmitter buffer and a receiver buffer, and processors and so forth in a system. Node 210a and node 210b may correspond to communication unit 110a and communication unit 110b from FIG. 1, respectively. The nodes 210a-210b may use differential signals and differential transmission lines between them. Functional and control blocks and units used for the data acquisition and processing are not shown for ease of illustration. The nodes 210a-210b utilize lanes 250 and 252 for communication.

Parallel data within a given one of the nodes 210a-210b may include control, status, address, parity, and data values. The parallel data may be placed on a respective one of the buses 230a-230b. The parallel data may be serialized by a transmitter block before transmission on a given one of the lanes 250 and 252. The serialized data may be de-serialized by a receiver block upon reception. For example, regarding lane 250, node 210a is the transmitter block and node 210b is the receiver block. Regarding lane 252, node 210b is the transmitter block and node 210a is the receiver block.

Serial transmission protocols may be used on lanes 250 and 252, such as a low voltage differential signaling protocol (LVDS) or differential current mode logic (CML). Serial transmitter and receiver circuits may be used by nodes 210a-210b to perform high-speed serialized data transmission. For example, the node 210a uses transmitter 220a and receiver 222a to form a communication unit. The node 210b uses transmitter 220b and receiver 222b to form a communication unit. Although a single transmitter 220 and receiver 222 are shown for each respective node 210a and 210b, other embodiments may include a different number of transmitters and receivers.

In the embodiment shown, the transmitter and receiver circuits within the nodes 210a-210b utilize an architecture with embedded clock information. Other architectures may be selected and used, in other embodiments. Node 210b is the transmitter for lane 252. The transmitter 220b serializes the parallel data on the bus 230b. The transmitter 220b additionally receives the clock signal 232b. Transmitter 222b combines the data A-G and the clock signal 232b onto one serial signal pair on lane 252 as serial data stream 260. In some embodiments, transmitter 220a receives clock signal 232b and generates two clock signals internally for transmitting even bits of the data stream 262 and odd bits of the data stream 264, respectively. Splitting the clock source for the even and odd bits, may, in some embodiments, allow for more flexibility in adjusting the transmitter output and, therefore, higher transmission baud rates. In other embodiments, other divisions of bits may utilized in place of alternating odd and even bits between the clock sources. Any suitable number of consecutive bits may be routed to circuits using a first clock before routing a next bit to other circuits using a second clock. For example, an embodiment may route four consecutive bits to a first circuit clocked by a first clock and then route the next four bits to a second circuit clocked by a second clock.

In various embodiments, the serialized data stream with the data A-G may have a leading header to indicate valid data is being transmitted. In some embodiments, transmitter 220b may send pseudo-random data to the receiver 222a when node 210b does not have valid data to send. Node 210a may use the pseudo-random data for tuning and calibrating both the data and clock recovery circuits. The header in serial data stream 260 may indicate when valid data is being transmitted. Receiver 222a receives serial data stream 260 and samples each data bit at a sample time determined during a configuration step. The sampled data is stored in a receive buffer until a complete data word has been read and in some embodiments, also validated. The received data word may then be placed on bus 230a for use by node 210a.

Time may be consumed to initialize and configure the serial communication link before high-speed data communication begins. To initialize a link, a process referred to as channel training may be utilized to configure lanes 250 and 252. To initialize lane 252 for example, transmitter 220b may send a stream of bits to receiver 222a. The series of bits may be known to both node 210a and node 210b in advance. In some embodiments, the stream of bits may be a consistent string of bits and may be repeated as necessary until the training is complete. In other embodiments, the stream of bits may be the output of a deterministic function, such as a pseudo-random binary sequence (PRBS), which may be sent continuously until link training is complete. Receiver 222a may sample the stream of bits until a suitable sampling time is determined.

During the configuration time, internal phase locking circuits, such as, e.g., phase-locked-loops (PLLs), and clock data recovery (CDR) circuits are stabilized and reach a locked state. Duty cycle correction (DCC) circuits and clock phase generators are adjusted. Phase interpolators (circuits for adjusting the timing of the clock edges) are adjusted by CDR circuits to place the transitioning edges of sampling circuits in the middle of the data bits. Equalization circuits start to recondition the signals to maximize the data valid margin and to reduce bit error rates (BER). Adjustments may be made to transmitters 220 and 220b and receivers 222a 222b to establish a reliable communications link 200.

A portion of the parameters determined during the initialization and configuration may remain consistent over time and over a range of operating conditions (herein referred to as "time invariant parameters"). These time invariant parameters may be used to determine a set of parameters that do vary over time due to changes in operating conditions, environmental influences, etc. (referred to herein as "time variant parameters"). The determination process may be a recursive process as the time variant parameters may be used to re-determine the time invariant parameters, and vice versa until a consistent set of time invariant parameters is determined. In some embodiments, after the consistent set of time invariant parameters is determined, this set may be stored in persistent storage. The persistent storage maintains the stored data through a power down mode, such as a mode with a respective clock signal disabled. In other embodiments, the time invariant set of parameters is stored in persistent storage in response to receiving a power down indication. In yet other embodiments, each of the time invariant and the time variant set of parameters are stored in persistent storage.

The time invariant set of parameters may be determined to be associated with the channel properties of the lanes 250-252. Therefore, the time invariant set of parameters may take some number of cycles longer to settle than the time variant set of parameters. The time variant set of parameters associated with clock data recovery may be faster to adapt and settle. For example, millions of cycles may be consumed for determining the time invariant set of parameters, whereas a few thousand cycles may be consumed for determining the time variant set of parameters. After turning off the lanes 250-252, a subsequent power up or awakening operation may occur. During the awakening operation, the stored time invariant set of parameters may be used as initial values for the configuration steps, thereby significantly reducing the time consumed for adapting and settling final values. In contrast, the time variant set of parameters may be reinitialized for the configuration steps. Since initial values are used for the time invariant set of parameters, the delay to begin using the lanes 250-252 for data transport may be greatly reduced. In some embodiments, the time variant set of parameters may be stored in persistent storage and used as initial values during a power up operation. However multiple factors may have changed, such as chip temperature, which cause the initial values to lose benefit.

The illustration and description of FIG. 2 are presented as an example of a communication link. In other embodiments, various features and functional blocks may differ or be present in different quantities.

Figure 3A:
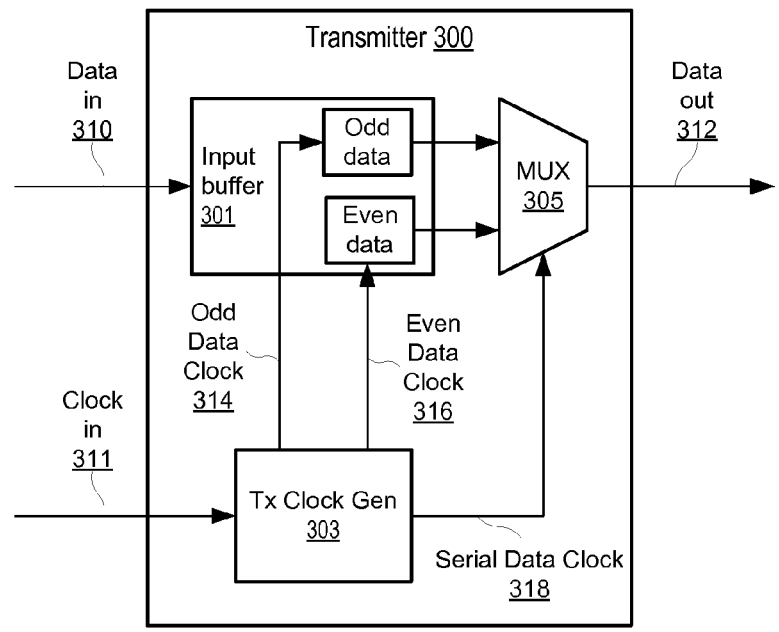
FIG. 3 includes two figures, FIG. 3A illustrating an embodiment of a transmitter in a serial communication link and FIG. 3B illustrating a timing diagram associated with FIG. 3A.

Turning now to FIG. 3, an embodiment of a transmitter used in a serial communication link is illustrated in FIG. 3A. Transmitter 300 may correspond to transmitter 220a and/or transmitter 220b in FIG. 2. Three sub-modules are included in transmitter 300: input buffer 301, transmitter clock generator 303, and multiplexor (MUX) 305. Transmitter 300 receives data in signal 310 and clock in signal 311, and outputs data out signal 312.

In the illustrated embodiment, input buffer 301 includes an odd data buffer and an even data buffer. All bits of a data word received via data in signal 310 are received in parallel. In various embodiments, data words may be any suitable bit-width, e.g., 8-bits, 16-bits, 32-bits, etc. Input buffer 301 receives a data word and parses the data into even and odd data bits. In some embodiments, the bits may be stored in separate shift registers or other suitable circuits to be serially sent to MUX 305 in a predetermined order, such as, for example, least significant bit (LSB) first or most significant bit (MSB) first.

MUX 305 may receive both even and odd data bits and alternate between selecting each to drive onto data out signal 312, thereby creating a serial data stream. After a data bit has been sent via data out signal 312, input buffer 301 may shift or place the next consecutive bit on the input to MUX 305. For example, when an odd bit has been sent and MUX 305 switches to the even bit, input buffer 301 shifts the next odd bit to MUX 305 and vice versa for the even bits.

Timing for input buffer 301 shifting the data bits and timing for MUX 305 selecting the data bits is controlled by transmitter clock generator 303. Transmitter clock generator 303 receives clock in signal 311 and uses it to produce clock signals for shifting the odd data bits (odd data clock 314) and the even data bits (even data clock 316) in input buffer 301, and for controlling timing of MUX 305 selecting between the odd and the even inputs (serial data clock 318).

Generally speaking, a multiplexor, or MUX, is a circuit with a plurality of signal inputs and a fewer number of outputs. One or more control inputs determine which of the input signals are passed to the one or more output signals. In the present example, MUX 305 includes two inputs and a single output. Various circuits are known for implementing multiplexors and MUX 305 may include any suitable design.

Figure 3B:
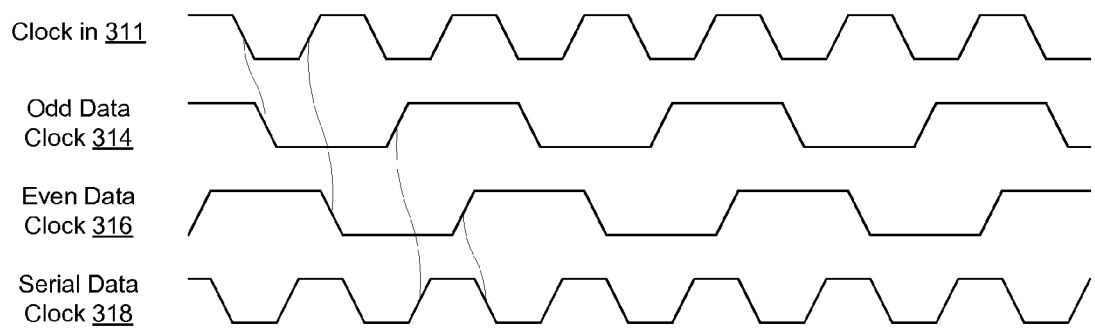

The timing diagram of FIG. 3B illustrates example signals for clock in signal 311 and the three clock signal outputs of transmitter clock generator 303. In the illustrated example, clock in signal 311 is shown as operating at a similar frequency to serial data clock 318. In other embodiments, however, clock in signal 311 may be a reference clock for a PLL or other clock generation circuit within the transmitter clock generator and may therefore operate at a different frequency than serial data clock 318. Since the present example shows clock in signal 311 operating at the frequency as serial data clock 318, each of even data clock 314 and odd data clock 316 can be generated by dividing clock in signal 311 by two. This may be accomplished by toggling the state of odd data clock 314 on each falling transition of clock in signal 311 and toggling even data clock 316 on each rising transition. Serial data clock 318 operates at a frequency that is twice that of odd data clock 314 and even data clock 316 and may, therefore, be generated by combining odd data clock 314 and the even data clock 316.

Transmitter clock generator 303 may include adjustable delay circuits, such as clock phase interpolators, to shift timing of transitions of odd data clock 314 and even data clock 316 independently. Adjustment of these delay circuits may be a part of the configuration process (link training) described above, to improve the readability of data out signal 312 at a receiving end of the communications link. By having separate control of delays to odd data clock 314 and even data clock 316, a duty cycle of serial data clock 318, and subsequently the data out signal 312, may be managed to compensate for any duty cycle distortion that may be observed at the receiving end of the communications link.

It is noted that the block diagram of FIG. 3A is merely an example embodiment. Other embodiments may include additional functional blocks and functional blocks may be arranged in a different configuration. Data bits may be partitioned on a basis other than odd and even bits. Additionally, the waveforms in the timing diagram of FIG. 3B are also examples and are presented in a simplified form for demonstration of the disclosed concepts. Actual waveforms may appear different due to many factors including technology used for building actual circuits, topologies of the design, stability of power supplies, and electromagnetic interference from surrounding circuits.

Figure 4:
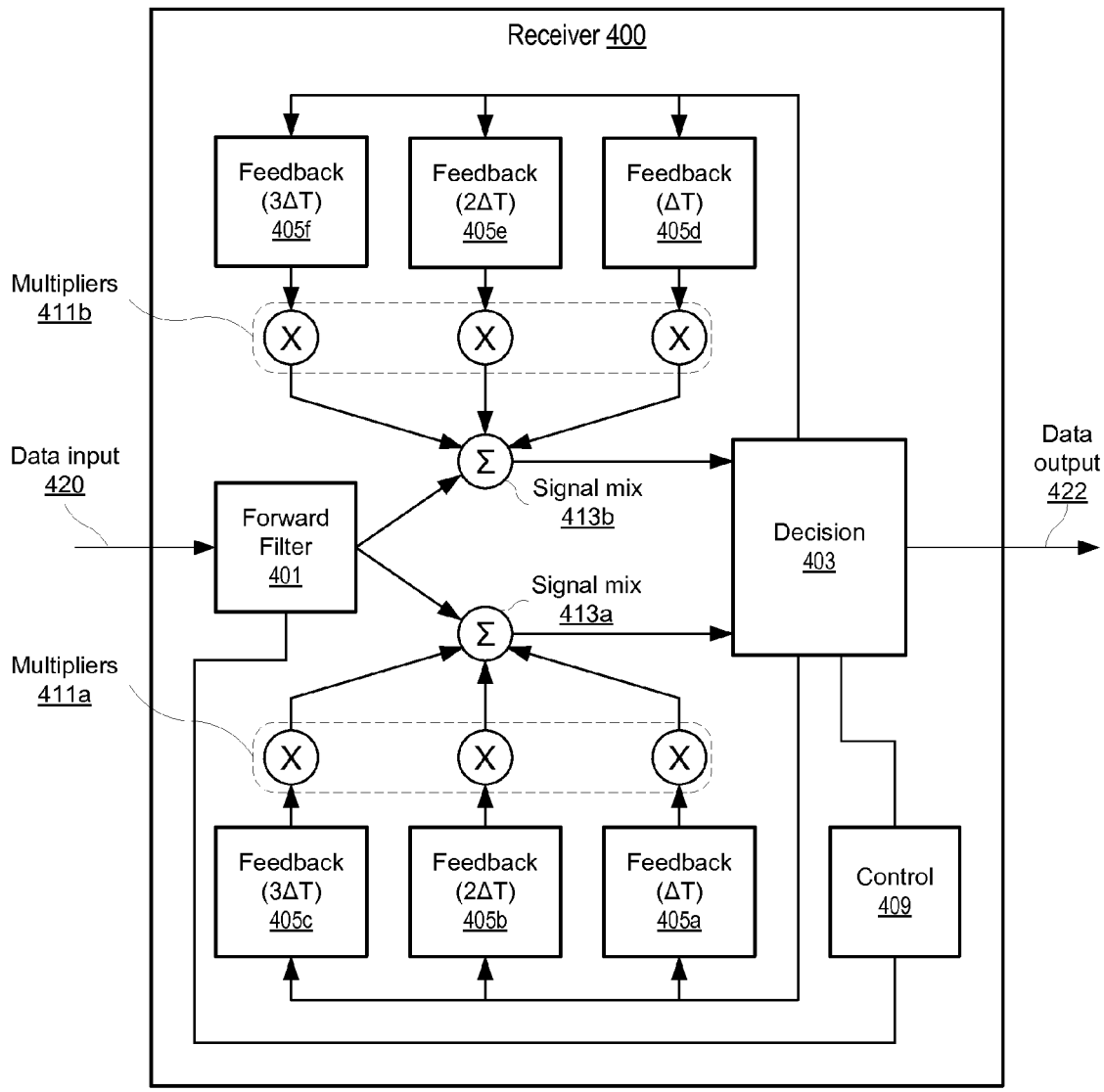
FIG. 4 illustrates an embodiment of a receiver in a serial communication link.

Moving on, FIG. 4 illustrates an embodiment of a receiver in a serial communication link. Receiver 400 may correspond to receiver 222a and/or receiver 222b of FIG. 2. The illustrated embodiment of receiver 400 includes sub-modules forward filter 401, decision block 403, feedback circuits 405a-405f, control unit 409, multipliers 411a and 411b, and signal mixers 413a and 413b. In addition, receiver 400 receives data in signal 420 and outputs data out signal 422.

In the illustrated embodiment, forward filter 401 receives data input signal 420, which may correspond to the data output signal 312 from transmitter 300 in FIG. 3. Data in signal 420 is a serial bit stream which at various times may include data, headers, start bits, stop bits, and calibration data. As data bits are received, forward filter 401 estimates a starting point and stopping point for each data bit dependent upon parameters determined during a link training process. Forward filter 401 parses the data bits into even and odd data streams. The even data stream may be directed to signal mixer 413a and the odd data stream may be directed to signal mixer 413b.

Signal mixers 413a and 413b mix their respective incoming data streams with weighted values of previously received data bits, as provided via feedback circuits 405a-f and multipliers 411a and 411b. Signal mixers 413a and 413b subtract the feedback signals from the current bit of the respective data stream. Subtracting these weighted values of previously received data bits may reduce interference from the previously received data bits occurring during the current data bit time.

This interference may be caused by signal "reflections" in the path of the signal and/or a "skin effect" of the conductor used to carry the data stream. Signal reflections may occur in both wired connections as well as wireless connections between transmitter 300 and receiver 400. In both connection types, a signal reflection refers to a signal transition being duplicated when encountering an anomaly in the signal path. In a wireless connection, anomalies may include any physical change in the path. For example walls, furniture, windows, etc., may reflect some or all of a wireless signal such that the signal takes multiple paths from the transmitter to the receiver, resulting in the same signal arriving at the receiver at multiple times. In a wired connection, anomalies may include physical changes in a wire such as a change in wire thickness (i.e., "gauge"), a terminal where a wire couples to a circuit board, or a solder joint on a circuit board where a wire trace on the board connects to an IC. The wired anomalies may also cause a reflection when a signal contacts it, creating a delayed version of the signal.

The skin effect may occur in a wired connection and refers to a phenomenon in which an electrical signal tends to travel more along the surface of a metal conductor rather than through the middle of the conductor. Because of this, signals may be affected by the surface of the conductor. A rough surface may cause a signal to take a slightly longer time to arrive at a receiver than the same signal traveling over a same length of conductor with a smooth surface, sine the roughness creates a longer path for the signal to travel. In a single conductor, a signal may take multiple paths from transmitter to receiver as the signal travels around or over bumps in the conductive surface. Similar to reflections, this skin effect may cause multiple versions of a same signal to arrive at the receiver at different times.

Slower versions of the signal, due to reflections or skin effect, may continue into the next data bit time, thereby interfering with a logic level of a subsequent data bit. In high speed serial communication links, the interference from a first data bit can extend for several bit times, although the amount, or "magnitude," of the interference may diminish for each subsequent data bit. This phenomenon of interference from previously received data bits may also be referred to as "intersymbol interference" (ISI).

To compensate for ISI, receiver 400 includes feedback circuits 405a-f. Feedback circuits 405a-f track bit values as determined by decision block 403 for one or more previous data bits. As shown, feedback circuits 405a and 405d track the previously received data bit, feedback circuits 405b and 405e track the data bit received two bit times earlier, and feedback circuits 405c and 405f track the data bit received three bit times earlier. The feedback circuits for a given data bit time may be referred to herein as "feedback taps" or simply "taps." For example, feedback circuits 405a and 405d may be referred to as first taps, feedback circuits 405b and 405e as second taps and feedback circuits 405c and 405f as third taps. Although three feedback taps are shown for use with each of the even and odd data streams, any suitable number of taps may be used in other embodiments.

Multipliers 411a and 411b are used to weight the output of each feedback circuit 405, i.e., assign a magnitude (also referred to herein as "level") of the interference for each previous data bit. Typically, the most recent data bit will have the highest magnitude and, therefore, the most influence on the current data bit signal. The magnitudes used in each of the multipliers 411a-b may be dependent on the calibration parameters as well as current signal analysis in decision block 403. As stated above, the outputs of each of the multipliers 411a-b are sent to one of the signal mixers 413a-b, with multipliers 411a coupled to signal mixer 413a and multipliers 411b coupled to signal mixer 413b. The signal mixers 413a-b send the modified data streams to decision block 403 which alternates between the modified even data stream from signal mixer 413a and the modified odd data stream from signal mixer 413b. Decision block 403 determines a logic value for each even and odd data bit and constructs the received bits into one or more data words to be read by one or more functional blocks external to receiver 400.

In addition to ISI, duty cycle distortion (DCD) can impact the ability of receiver 400 to accurately read the data in signal 420. DCD, as used herein, refers to a difference in data bit valid times (i.e., a length of time that a given data bit may be read accurately) between successive data bits. For example, for a 3 Gbps transmission rate, each bit is driven by the transmitter for 333 picoseconds before the next data bit is transmitted. Allowing for signal transition time between bits of 33 picoseconds, a given communication link may have a data bit valid time of 300 picoseconds when the duty cycle is 50%. If, however, the duty cycle skews such that even data bits are driven 30 picoseconds early, then even data bits may have a data bit valid time of 330 picoseconds and odd data bits have a data bit valid time of 270 picoseconds. The abbreviated data bit valid time of the odd data bit stream may cause errors when reading these bits. The DCD may occur due to clock skew between the even data clock 316 and odd data clock 314 in FIG. 3B or can be caused characteristics of the link path between transmitter 300 and receiver 400, such as the physical distance the data in signal 420 travels, or the impedance of wires in the path.

To compensate for DCD, control unit 409 may configure receiver 400 to determine the duty cycle of the data in signal 420. To determine a duty cycle between even and odd bits, outputs from at least one of the feedback taps for both the even data stream and the odd data stream are compared. Measuring the duty cycle may be performed as part of a link training process during a communication link initialization, or as part of a calibration process performed after initialization. In various embodiments, link calibrations may be performed at a predetermined schedule (i.e., at a predetermined time interval), during idle periods when transmitter 400 is not sending valid data, or in response to a bit error rate reaching a predetermined threshold. As part of the calibration, transmitter 400 may send a known predetermined data pattern or deterministic pseudo-random binary sequence to receiver 400.

To determine a duty cycle for receiver 400, control unit 409 configures decision block 403 to calculate feedback magnitudes for the odd data stream only, determining an odd data feedback value. In various embodiments, control unit 409 may process the odd data stream for a predetermined amount of time or predetermined number of data bits, or may allow the odd data stream feedback calculations to run until a set of operating parameters are determined. Control unit 409 then repeats the process for the even data stream to determine an even data feedback value. The even and odd data feedback values are then compared and if a difference between the values is greater than a predetermined threshold, then the communication link is considered to have an unacceptable amount of DCD. Control unit 409 may determine if the odd data stream or even data stream has longer data bit valid times based on the odd and even data feedback values. In a system such as communications link 200 in FIG. 2, for example, if receiver 222a determines that DCD from transmitter 220b is at an unacceptable level, then information regarding which data bits have elongated data bit valid times by how much may be sent via transmitter 220a and receiver 222b back to transmitter 220b. Transmitter 220b may attempt to correct the DCD by adjusting delays of transitions of the odd data clock and/or even data clock based on the received information. Transmitter 220b may send a new stream of PRBS data (or may not have stopped sending the PRBS data) to receiver 222a to determine the DCD with the adjusted settings. This process may continue to repeat until the DCD observed in receiver 222a is at or below the predetermined threshold.

It is noted that control unit 409 may be implemented by various circuits. Control unit 409 may be realized as a state machine, a programmable logic array, a custom processing unit, or as a general purpose controller executing software instructions.

It is also noted that receiver 400 of FIG. 4 is merely an example. The block diagram has been simplified to illustrate the necessary components for demonstrating the disclosed concepts. In other embodiments, receiver 400 may include additional functional blocks and may have different connections between blocks. Although data was shown as being organized into odd and even data streams, other methods of partitioning the data bits may be used.

Figure 5:
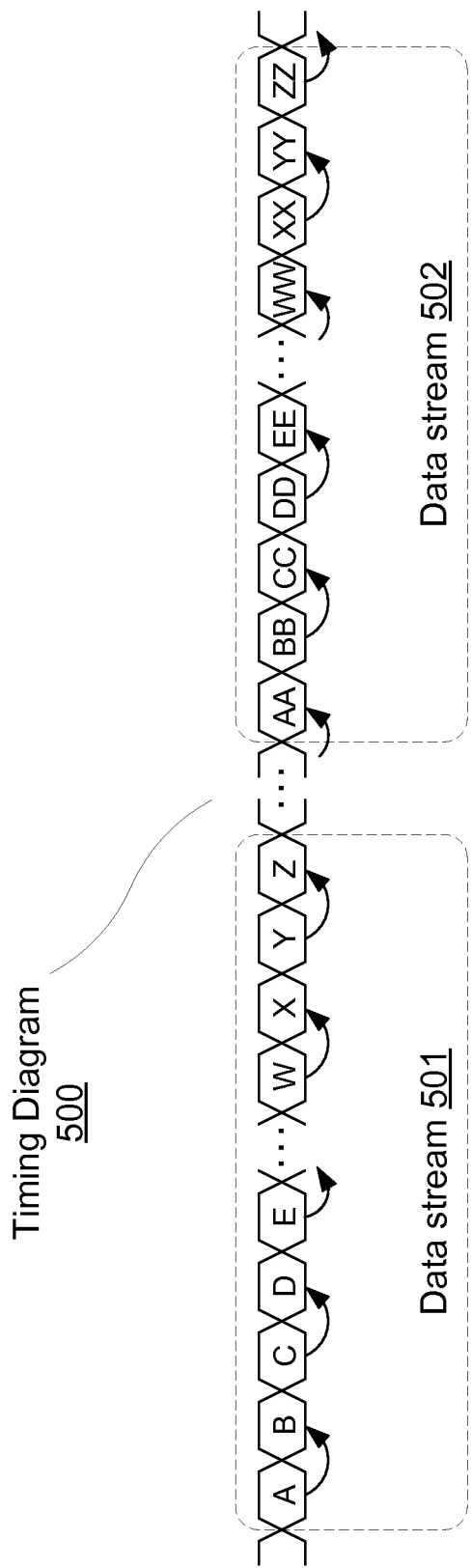
FIG. 5 is a representation of a timing diagram of a serial data stream corresponding to an embodiment of a serial communication link.

Turning now to FIG. 5, a representation of a timing diagram of a serial data stream is illustrated. Timing diagram 500 corresponds to an embodiment of a serial data stream that may be received by a serial receiver, such as, for example, receiver 400 in FIG. 4. Timing diagram 500 includes two portions of a serial data stream: data stream 501 and data stream 502. The data bits of each of data streams 501 and 502 are transmitted and received in a particular ordered sequence, starting with a data bit in a initial sequence position and ending with a data bit in a last sequence position. In the present embodiment, each letter corresponds to one data bit in its corresponding sequence position. Bit 'A' is the initial sequence position of data stream 501 and bit 'Z' is the last sequence position. In a similar fashion, bit 'AA' is the first bit sequence position and bit 'ZZ' is the last sequence position of data stream 502. All data bits for a one portion of a serial data stream may be received prior to receiving data bits from a second portion. For example, in timing diagram 500, data bit 'Z' of data stream 501, which occupies the last sequence position of data stream 501, is received before the data bit occupying the initial sequence position, namely data bit 'AA,' of data stream 502.

To determine a duty cycle for the serial data stream, data bits at different sequence positions in each of portion of a data stream are examined. For example, in the embodiment illustrated in FIG. 5, data bits at odd numbered sequence positions in data stream 501 and data bits at even numbered sequence positions in data stream 502 are examined. During operation, receiver 400 is first adjusted to determine feedback magnitudes for each data bit at an odd sequence position in data stream 501, i.e., bits A, C, E . . . W, and Y. An overall feedback magnitude for data stream 501 is identified dependent upon the individual magnitudes for each of the aforementioned data bits. Once the odd feedback magnitude has been identified, receiver 400 is adjusted to determine feedback magnitudes for each data bit at an even sequence position in data stream 502, i.e., BB, DD . . . XX, and ZZ. Again, an overall feedback magnitude is identified for data stream 502. If the even and odd feedback magnitudes are within a predetermined value of each other, then the duty cycle of the serial data stream is within an acceptable limit. Otherwise, if the odd feedback magnitude is greater than the even feedback magnitude by the predetermined amount or more (or vice versa), then the serial data stream is experiencing an unacceptable level of duty cycle distortion.

It is noted FIG. 5 is merely an example of a timing diagram of a serial data stream. In various embodiments, any suitable number of data bits may be included in each of the odd data stream and the even data stream and the number of data bits used to calculate a respective feedback magnitude may not be equal between the odd and even data streams. Although the ordered data bits are shown to be analyzed in odd and even groupings, any suitable grouping may be utilized.

Figure 6A:
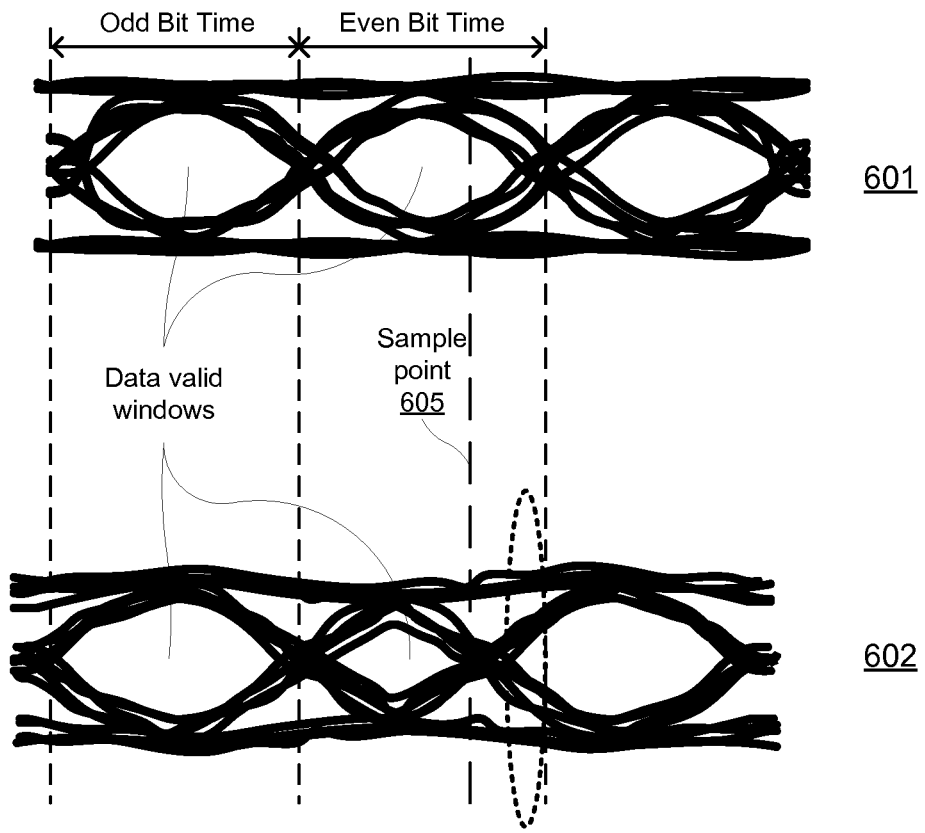
FIG. 6A is a representation of a timing diagram illustrating two embodiments of serialized data from an embodiment of a serial communication link.

Moving now to FIG. 6, two illustrations are shown. In FIG. 6A, representations of two timing diagrams of two embodiments of a serial data stream are illustrated. These timing diagrams represent the voltage of differential data lines over time for many data bits as may be received by a receiver, such as receiver 400 in FIG. 4. The thickness of the black lines illustrates the range of the voltage of the differential data lines due to various factors that may couple noise into the lines or create jitter from bit-to-bit over time.

In timing diagram 601, a data stream is illustrated with approximately a 50% duty cycle between odd and even data bits. As can be seen, the data valid windows (also referred to as "data eyes") of the even and odd data streams are of similar shape and size. Timing diagram 602 illustrates a data stream in which the data eyes for the odd data stream are greater than the data eyes of the even data stream. Generally speaking, the closer the duty cycle is to 50%, the lower the bit error rate and the more accurately the data may be read. It is noted that if the even bits are sampled near the end of the even bit data valid time as indicated by sample point 605, the even bits of timing diagram 601 are more likely to be read accurately than the even bits of timing diagram 602.

Figure 6B:
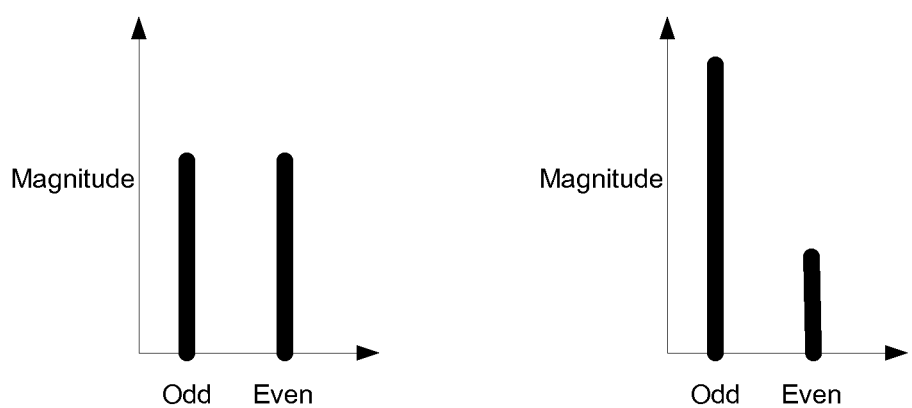
FIG. 6B is an illustration of two graphs of feedback magnitudes corresponding to the embodiment of FIG. 6A.

In FIG. 6B, two example graphs are illustrated to demonstrate how feedback analysis relates to duty cycle. Graph 611 and graph 612 may correspond to timing diagrams 601 and 602, respectively. The graphs represent determined magnitudes of feedback taps for the odd data stream and the even data stream in a serial communication receiver, such as, for example, receiver 400 in FIG. 4. The feedback magnitudes are determined while receiver 400 is adjusted to determine odd feedback magnitudes and even feedback magnitudes separately, as described above for FIG. 5. Multiple data bits from each of the even and odd data streams may be sampled in order to collect enough data to calculate a feedback magnitude.

Feedback magnitude, as used herein, relates to an amount of influence a signal for a previously received data bit has on the signal for a data bit currently being read. As previously stated, multiple factors can cause a previously received data bit signal to influence the signal of a data bit currently being read. Referring back to receiver 400 of FIG. 4, feedback circuits 405a-f and multipliers 411a-b track values of previous data bits and magnitudes of how much a previous data bit may influence the value of a current data bit. In timing diagram 601, in which the duty cycle is close to 50%, the even data bits and odd data bits may have a relatively equal influence on the signal of the subsequent data bit. Accordingly, graph 611 shows that the feedback magnitudes of the even and odd data streams are basically equal.

In timing diagram 602, the data eyes of the even data stream are noticeably smaller than the eyes of the odd data stream. It can be seen that previous signals for the odd data bits encroach into the even bit time as highlighted by the circled area. Conversely, the signals for the even data stream have little influence on signals for subsequent odd data bits. As a result, graph 612 indicates a spike in the magnitude of the odd data stream and a reduction in the magnitude of the even data stream. Accordingly, it is noted that a difference in feedback magnitudes between the odd and even data streams may correlate to a duty cycle between the odd and even data streams: chart 611 shows equal feedback magnitudes corresponding to a 50% duty cycle, while chart 612 shows a larger odd feedback magnitude than the even feedback magnitude which corresponds to a duty cycle with larger odd data eyes than even data eyes.

The examples of FIGS. 6A and 6B are merely for the purposes of demonstration. In various embodiments of FIG. 6A, serial data may be observed in a variety of shapes and sizes based upon the characteristics of an individual communication link. For example, bit rate of the data stream, format of the data, clock jitter, EMI, impedance of the connection, and length of the connect are just a few factors that may determine the actual shape of received data eyes in any serial communication link. In various other embodiments of FIG. 6B, it is contemplated that other sampling methods may be used in place of, or in conjunction with, determining differences between feedback magnitudes of odd and even data streams. Measured results may differ from the results depicted in the aforementioned graphs for various reasons, such as, e.g., inaccuracies in test equipment, and the like.

Figure 7:
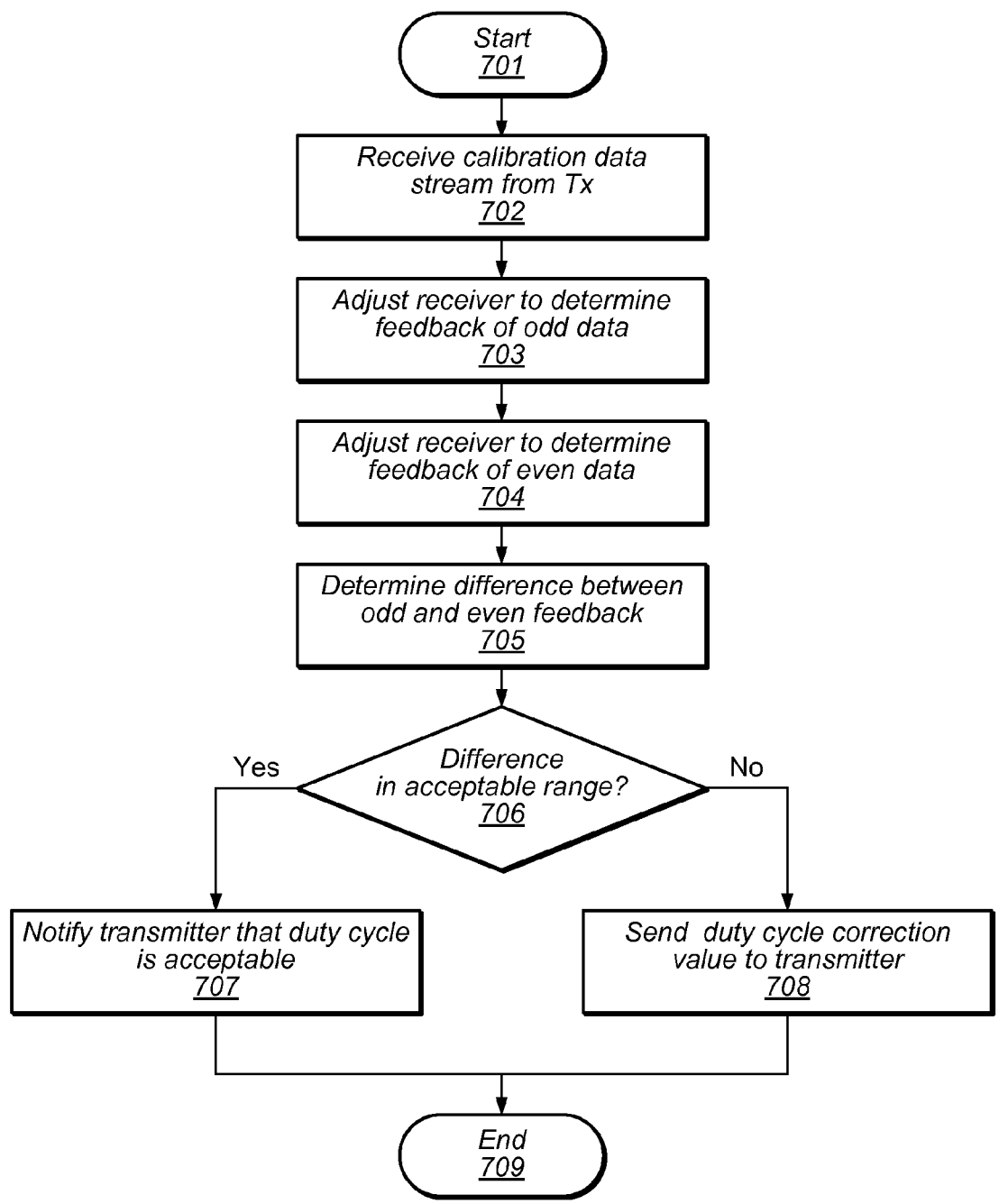
FIG. 7 is a flow diagram illustrating a method for detecting duty cycle distortion in an embodiment of a receiver in a serial communication link.

Turning to FIG. 7, an embodiment of a method is illustrated for detecting duty cycle distortion of a received serial data stream. This method may be employed with a serial communication link such as, for example, communication link 200 in FIG. 2, in which transmitter 220b corresponds to transmitter 300 of FIG. 3 and receiver 222a corresponds to receiver 400 of FIG. 4. The method may be used in a connection in which the data is transmitted asynchronously from node 210b to node 210a. Referring collectively to FIG. 2, FIG. 3, FIG. 4, and FIG. 7, the method may begin in block 701.

Transmitter 220b may send a serial data stream to receiver 222a (block 702). The data stream may be sent as part of a link training process for lane 252 during an initialization of communication link 200 or as part of a calibration process of lane 252 in response to a detected increase in bit error rates. In other embodiments, a calibration process of lane 252 may be performed when node 210b has no data to send to node 210a and would otherwise be idle. The data may be sent as a predetermined bit pattern known to both node 210a and node 210b, or may be sent as a deterministic function in the form of a pseudo-random binary sequence (PRBS). In the present example, the serial data stream is received via a wired connection between node 201b and node 210a. In other embodiments, however, it is contemplated that data may be transmitted over a wireless connection between nodes 210a and 210b.

Receiver 222a may adjust to determine a magnitude for the feedback of the odd data stream (block 703). To determine the feedback in the present example, control circuitry in receiver 222a adjust a decision block to determine magnitudes for a first feedback tap, corresponding to the most recently received previous data bit. Other embodiments may include feedback from additional feedback taps. The decision block may collect the feedback data until a magnitude has been determined that accurately represents the odd data stream. The number of data bits used for the determination may be based on a predetermined number of bits or a predetermined period of time. In other embodiments, the decision block may continue to determine feedback magnitudes until the magnitude values stabilize, i.e., the difference between a most recent magnitude value and a previous magnitude value is below a threshold amount.

Receiver 222a adjusts to determine a magnitude for the feedback of the even data stream (block 704). Once the odd data feedback magnitude has been determined, receiver 222a repeats the feedback magnitude process for the even data stream. The method continues upon the determination of an even feedback magnitude.

A difference between the even feedback magnitude and the odd feedback magnitude is determined (block 705). The control circuitry in receiver 222a compares the determined values for the even and odd feedback magnitudes to determine a difference. As previously mentioned, a difference between the even and odd magnitudes may indicate the presence of duty cycle distortion (DCD) in the received serial data stream.

The further actions of the method may depend on the value of the determined difference between the even and odd feedback magnitudes (block 706). If the difference in even and odd feedback magnitudes is within a predetermined range of values, then the duty cycle of the serial data stream is considered acceptable and the method moves to block 707. Otherwise, if the determined difference falls outside the predetermined range, then DCD in the received data stream is unacceptable and method moves to block 708.

Upon determining that the duty cycle is acceptable, receiver 222*b* sends a message to transmitter 220*a* via transmitter 220*b* and receiver 222*a* (block 707). Control circuitry in receiver 222*b* may send a value based on the determined difference of the feedback magnitudes to transmitter 220*a* or may simply send a predetermined value indicating that the duty cycle is acceptable. The calibration process may progress to a next stage or may be complete at this point. The method ends in block 709.

Upon determining that an unacceptable level of DCD is present in the serial data stream, receiver 222*b* sends correction information to transmitter 220*a* via transmitter 220*b* and receiver 222*a* (block 707). The correction information may correspond to a value based on the determined difference of the feedback magnitudes, including an indication that either the odd or even data stream has a higher feedback magnitude. In other embodiments, the correction information may include an indication of a data transmission clock to adjust (e.g., odd data clock 314 or even data clock 316) and a factor by which to adjust the indicated clock. Once the correction information has been sent by receiver 222*b*, the method ends in block 709.

It is noted that the method illustrated in FIG. 7 is merely an example and that, in other embodiments, different operations may be included. Although the operations illustrated in the method of FIG. 7 are depicted as being performed in a sequential fashion, in some embodiments, some or all of the operations may be performed in parallel or in a different order.

Figure 8:
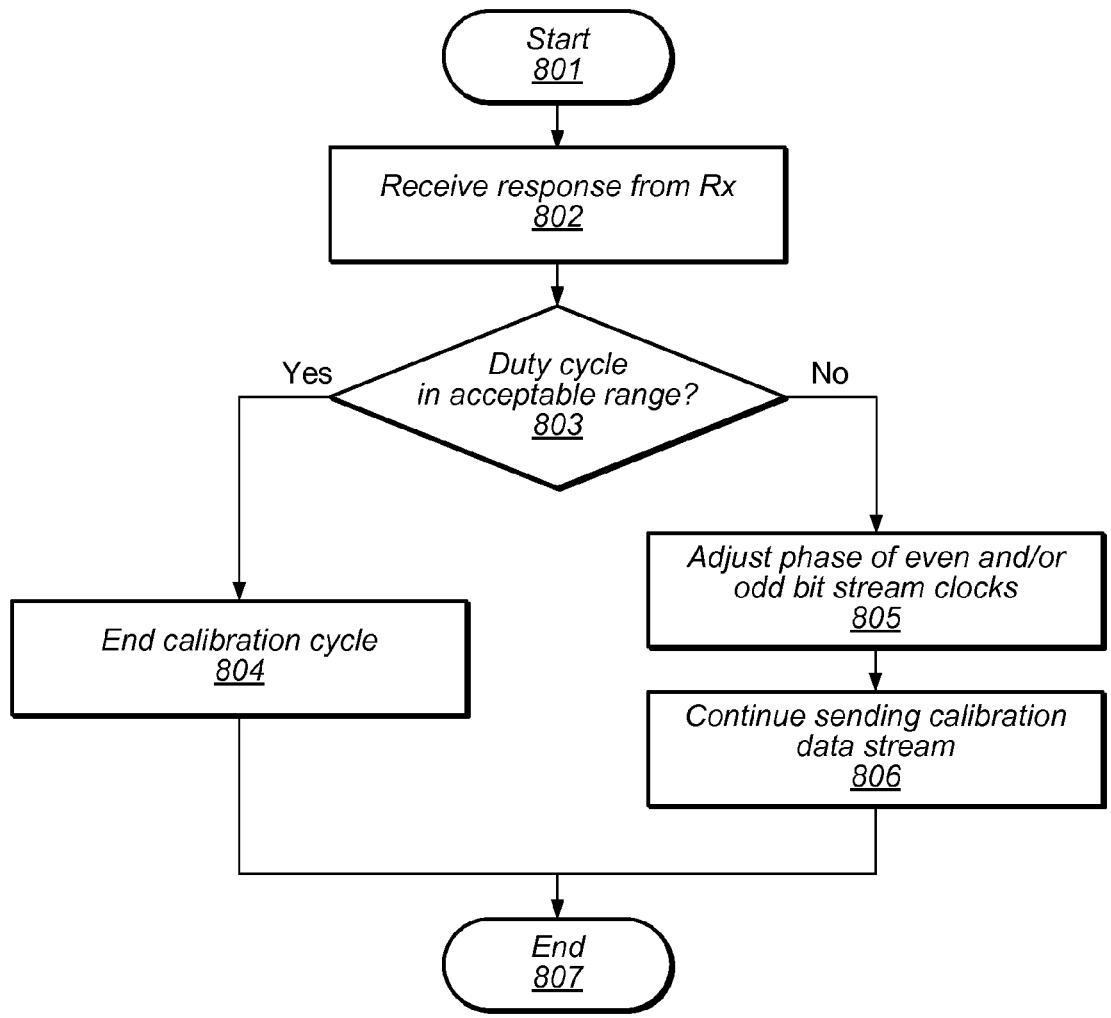
FIG. 8 is a flow diagram illustrating a method for correcting duty cycle distortion in an embodiment of a transceiver in a serial communication link.

Moving to FIG. 8, an embodiment of a method is illustrated for correcting duty cycle distortion in an embodiment of a transceiver in a serial communication link. This method may be employed with a serial communication link such as, for example, communication link 200 in FIG. 2, in which transmitter 220*b* corresponds to transmitter 300 of FIG. 3 and receiver 222*a* corresponds to receiver 400 of FIG. 4. The method may be used in a connection in which the data is transmitted asynchronously from node 210*b* to node 210*a*. Referring collectively to FIG. 2, FIG. 3, FIG. 4, and FIG. 8, the method may begin in block 801 with transmitter 220*b* actively sending a calibration data stream to receiver 222*a*.

Transmitter 220*b* may receive a response from receiver 222*a* (block 802). The message may be sent via transmitter 220*a*, which is coupled to receiver 222*a* within node 210*a*, to receiver 222*b*, which is coupled to transmitter 220*b* within node 210*b*, via lane 250. The response may include data indicating if the duty cycle of the serial calibration data stream being sent by transmitter 220*b* is acceptable or not, based on a duty cycle detection process being performed by receiver 222*a*.

The further actions of the method may depend on the value of the data in the response from receiver 222*a* (block 803). If the data indicates that the duty cycle is acceptable, then the method may move to block 804. In some embodiments, the data may be a predetermined value indicating an acceptable duty cycle. In other embodiments, the data may correspond to a value of a difference between an even data feedback magnitude and an odd data feedback magnitude, in which case, control circuitry in transmitter 220*b* analyzes the data to make a determination if the duty cycle is acceptable or not. In such an embodiment, the control circuitry in transmitter 220*b* may make a determination as described above for block 706 of FIG. 7. If the data indicates that the duty cycle is not acceptable, then the method moves to block 805 to determine an adjustment.

If the duty cycle is acceptable, then transmitter 220*b* may end the calibration cycle (block 804). Ending the calibration cycle may entail determining if node 210*b* has data to send to node 210*a* and then sending any such data. If no data is to be sent, then, in some embodiments, transmitter 220*b* may enter an idle state and cease sending the calibration data stream. In other embodiments, transmitter 220*b* may not stop sending the calibration data stream until node 210*b* has data to send to node 210*a*. This may allow receiver 222*a* to run a calibration process whenever control circuitry in receiver 222*a* determines it is necessary. The method may end in block 807.

If the duty cycle is determined to be unacceptable, then transmitter 220*b* may determine adjustments to the phase of the even and/or odd data transmission clocks (block 805). The data transmission clocks may correspond to even data clock 316 and odd data clock 314 in FIG. 3. In some embodiments, the data received in block 802 may indicate which data clock(s) to adjust and by how much to adjust it. In other embodiments in which the received data corresponds to the difference between the even and odd data feedback magnitudes, then control circuitry in transmitter 220*b* will determine which data clock(s) to adjust and a determine an amount to adjust the clock(s) and then implement the determined adjustments.

After the control circuitry in transmitter 220*b* has adjusted the data clocks, transmitter 220*b* continues to send the calibration data stream (block 806). Calibration data is sent after the adjustments to allow receiver 222*a* to determine an updated duty cycle and confirm if the adjustments have brought the duty cycle into the acceptable range or if further adjustments are required. In some embodiments, transmitter 220*b* will not pause sending the calibration data stream while the clock(s) are adjusted. In other embodiments, transmitter 220*b* may pause the transmission of the calibration data stream while the clock(s) are adjust and resume transmission after the adjustments are made. The method may end in block 807.

It is noted that the method illustrated in FIG. 8 is an example and that, in other embodiments, different operations may be included. Although some operations illustrated in the method of FIG. 8 are depicted as being performed in a sequential fashion, in some embodiments, some of the operations may be performed in parallel or in a different sequence.

It is noted that the above-described embodiments may be implemented, in part or in whole, by software stored in a system and executed by a processing unit. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a receiver circuit configured to serially receive each data bit of a plurality of data bits from a transmitter;
a feedback circuit configured to:
measure a first level of interference caused by each data bit of a first subset of the plurality of data bits on a respective subsequent data bit of the plurality of data bits to generate a first plurality of feedback values; and
measure a second level of interference caused by each data bit of a second subset of the plurality of data bits on a respective subsequent data bit of the plurality of data bits to generate a second plurality of feedback values; and
a control circuit configured to send a duty cycle correction value to the transmitter dependent upon a comparison of the first plurality of feedback values to the second plurality of feedback values.

2. The apparatus of claim 1, wherein the control circuit is further configured to determine a difference between the first plurality of feedback values and the second plurality of feedback values.

3. The apparatus of claim 2, wherein the control circuit is further configured to send a determine the duty cycle correction value corresponding to the difference.

4. The apparatus of claim 1, wherein each data bit of the first subset of the plurality of data bits occupies an odd numbered sequence position.

5. The apparatus of claim 4, wherein each data bit of the second subset of the plurality of data bits occupies an even numbered sequence.

6. The apparatus of claim 1, wherein the plurality of data bits includes a pseudo random binary sequence (PRBS).

7. The apparatus of claim 6, wherein the receiver circuit is further configured to receive the PRBS during a calibration operation.

8. A method comprising:
serially receiving, by a receiver circuit, each data bit of a plurality of data bits from a transmitter;
measuring a first level of interference caused by each data bit of a first subset of the plurality of data bits on a respective subsequent data bit of the plurality of data bits to generate a first plurality of feedback values;
measuring a second level of interference caused by each data bit of a second subset of the plurality of data bits on a respective subsequent data bit of the plurality of data bits to generate a second plurality of feedback values; and
sending a duty cycle correction value to the transmitter dependent upon a comparison of the first plurality of feedback values to the second plurality of feedback values.

9. The method of claim 8, further comprising determining a difference between the first plurality of feedback values and the second plurality of feedback values.

10. The method of claim 9, further comprising determining the duty cycle correction value corresponding to the difference.

11. The method of claim 8, wherein each data bit of the first subset of the plurality of data bits occupies an odd numbered sequence position.

12. The method of claim 11, wherein each data bit of the second subset of the plurality of data bits occupies an even numbered sequence position.

13. The method of claim 8, wherein the plurality of data bits includes a pseudo random binary sequence (PRBS).

14. The method of claim 13, wherein the PRBS data is sent to the receiver circuit during a calibration process involving the receiver circuit.

15. A system comprising:
a transmitter configured to send a plurality of data bits in a serial order;
a receiver configured to:
receive each bit of the plurality of data bits;
measure a first level of interference caused by each data bit of a first subset of the plurality of data bits on a respective subsequent data bit of the plurality of data bits to generate a first plurality of feedback values; and
measure a second level of interference caused by each data bit of a second subset of the plurality of data bits on a respective subsequent data bit of the plurality of data bits to generate a second plurality of feedback values; and
send a duty cycle correction value to the transmitter dependent upon a comparison of the first plurality of feedback values to the second plurality of feedback values.

16. The system of claim 15, wherein the receiver is further configured to determine a difference between the first plurality of feedback values and the second plurality of feedback values.

17. The system of claim 16, wherein the receiver is further configured to a determine the duty cycle correction value corresponding to the difference.

18. The system of claim 15, wherein each data bit of the first subset of the plurality of data bits occupies an odd numbered sequence position, and wherein each data bit of the second subset of the plurality of data bits occupies an even numbered sequence position.

19. The system of claim 15, wherein the plurality of data bits includes a pseudo random binary sequence (PRBS).

20. The system of claim 19, wherein the transmitter is further configured to send the PRBS to the receiver during a calibration process.

* * * * *